United States Patent [19]

Levin

[11] 4,339,174

[45] Jul. 13, 1982

[54] HIGH BANDWIDTH OPTICAL WAVEGUIDE

[75] Inventor: Philip S. Levin, Corning, N.Y.

[73] Assignee: Corning Glass Works, Corning, N.Y.

[21] Appl. No.: 117,391

[22] Filed: Feb. 1, 1980

[51] Int. Cl.³ .......................................... G02B 5/172
[52] U.S. Cl. .................................. 350/96.31; 65/3.12; 350/96.34
[58] Field of Search ............... 350/96.30, 96.31, 96.33, 350/96.34; 65/3.11, 3.12

[56] References Cited

U.S. PATENT DOCUMENTS

| | | | |
|---|---|---|---|
| 4,057,320 | 11/1977 | Marcatili | 350/96.31 |
| 4,106,850 | 8/1978 | Marcatili | 350/96.31 |
| 4,111,525 | 9/1978 | Kaminow et al. | 350/96.31 |
| 4,229,070 | 10/1980 | Olshansky et al. | 350/96.31 |
| 4,230,396 | 10/1980 | Olshansky et al. | 350/96.31 |

FOREIGN PATENT DOCUMENTS

2615534  2/1978  Fed. Rep. of Germany.

Primary Examiner—John D. Lee
Attorney, Agent, or Firm—William J. Simmons, Jr.

[57] ABSTRACT

An optical waveguide filament comprising a cladding layer, a core and a barrier layer disposed between the core and cladding. The barrier layer comprises silica doped with $B_2O_3$, $P_2O_5$ and $GeO_2$. The core consists of an inner region and an outer region, the boundary between which is referred to as the core break-point. In the outer region of the core, the concentration of $B_2O_3$ decreases linearly from its barrier layer level to zero at the core break-point, the $P_2O_5$ increases at a rapid rate from the barrier layer level to a first concentration level at the core break-point and the $GeO_2$ remains at a constant value between zero and the barrier level. In the outer region of the core, the $GeO_2$ increases from some level up to the barrier layer level to a greater value at the filament axis in a power law fashion. The $P_2O_5$ also increases in a power law fashion from the value thereof at the core break-point to a higher value at the filament axis, the increase in concentration of $P_2O_5$ in the outer core region increasing at a rate greater than the concentration of $P_2O_5$ would increase if the power law $P_2O_5$ gradient extended into the outer core region.

23 Claims, 8 Drawing Figures

HIGH BANDWIDTH OPTICAL WAVEGUIDE

BACKGROUND OF THE INVENTION

This invention relates to multimode optical fibers and more particularly to multimode optical fibers wherein a plurality of dopants are radially graded throughout the core in order to minimize modal dispersion.

It has been recognized that optical waveguides, the cores of which have radially graded index profiles, exhibit significantly reduced pulse dispersion resulting from group velocity differences among modes. This dispersion reducing effect, which is discussed in the publication by D. Gloge et al., entitled "Multimode Theory of Graded-Core Fibers" published in the Nov. 1973 issue of the Bell System Technical Journal, pp. 1563-1578, employs a radially graded, continuous index profile from a maximum value on-axis to a lower value at the core-cladding interface. The index distribution in this type of waveguide is given by the equation $$n(r) = n_1 [1 - 2\Delta(r/a)^\alpha]^{\frac{1}{2}} \text{ for } r \leq a \quad (1)$$

where $n_1$ is the on-axis refractive index, $n_2$ is the refractive index of the fiber core at radius a, $\Delta = (n_1^2 - n_2^2)/2n_1^2$ a is the core radius, and $\alpha$ is a parameter between 1 and $\infty$.

It was initially thought that the parabolic profile wherein $\alpha$ is equal to 2 would provide an index gradient that would minimize dispersion caused by group velocity differences among the modes. Thereafter, other values of $\alpha$ were derived for the purpose of improving various optical properties such as lowering attenuation and providing high bandwidths over broad bands of wavelengths. For example, see U.S. Pat. Nos. 3,904,268; 4,006,962; and 4,057,320. The aforementioned Gloge et al. publication also pertains to an attempt to minimize dispersion by setting $\alpha$ equal to $2-2\alpha$.

To make a high bandwidth multimode optical waveguide fiber it is necessary to precisely control the radial index of refraction of the core. A common method of forming such fibers is taught in U.S. Pat. Nos. 3,823,995 to Carpenter and 3,711,262 to Keck and Schultz, which patents teach examples of gradient index optical waveguides as well as examples of the formation of optical waveguides by inside vapor phase oxidation processes. Both of these patents are expressly incorporated herein by reference. The inside vapor phase oxidation processes include chemical vapor deposition, flame hydrolysis and any other processes by which vaporous material is directed into a heated tube, reacted with oxygen under the influence of heat and deposited on the inside wall surface of said tube. The material is deposited within the tube in successive layers and the tube is then removed from the heat to leave a fused blank. As will be understood, the central hole may be collapsed at the end of the deposition process, the blank may subsequently be reheated and the hole collapsed, or the hole may be collapsed during the drawing process. In any event, the blank or preform is subsequently heated and drawn into an elongated, fine strand. Inasmuch as the structure of the drawn strand or filament reflects the structure of the drawing blank or preform, it is important that the physical characteristics of the blank be carefully controlled.

In order to effect such change of the index of refraction of a blank or preform being formed by an inside vapor phase oxidation process, the chemical composition of the source materials, which, after reaction, comprise the ultimate material deposited on the inside surface of the tube, may be varied. The vapor mixture is hydrolyzed or oxidized and deposited on the inside surface of the tube and subsequently fused to form a high quality and purity glass. At the same time, one or more additional vapors can be supplied to the tube, each vapor being constituted of a chemical termed a "dopant" whose presence affects the index of refraction or other characteristics of the glass being formed.

In general, the method of forming optical waveguide blanks or preforms by the inside vapor phase oxidation process includes forming a barrier layer on the inside of the support or substrate tube prior to the deposition of the core glass with the substrate tube being the cladding. The principal function of the barrier layer is to minimize interface scattering and absorption losses by removing the core-cladding interface which would exist between deposited layers of high purity, low attenuation glasses and the substrate tube inner surface. The barrier layer is conventionally a borosilicate glass composition since doping silica, which is generally the base glass, with boron reduces the deposition temperature and thereby minimizes shrinkage of the substrate tube. Other advantages of doping silica with boron are that it reduces the refractive index of the glass and it acts as a barrier to the diffusion of hydroxyl ions, commonly referred to as water, from the substrate tube to the deposited core glass at the elevated processing and drawing temperatures.

It has been found that the bandwidth of an optical waveguide filament produced by the inside vapor phase oxidation process sometimes falls far short of the predicted theoretical value. For example, an attempt was made to form low loss high bandwidth optical waveguide filaments of $SiO_2$ doped with $B_2O_3$, $GeO_2$ and $P_2O_5$ in amounts represented by curves 10, 12 and 14 of FIG. 1. In this Figure, "CL." refers to cladding, "B.L." refers to barrier layer, and the radii $r_o$, $r_a$, $r_b$ and $r_c$ refer to the filament axis, the core radius, the barrier layer radius and the outside or cladding radius, respectively. As noted in U.S. patent application Ser. No. 929,416, "High Bandwidth Optical Waveguides and Methods of Fabrication" filed July 31, 1978, Olshansky et al., now U.S. Pat. No. 4,230,396, such a filament exhibits a combination of step-graded index of refraction profile which causes pulse spreading of higher order modes, a factor which lowers bandwidth. One of the causes of the step-graded profile is the abrupt elimination of $B_2O_3$ at core-barrier layer interface. Because of the profile discontinuity at the edge of the core, the average bandwidth of this type of prior art optical filament is only about 240 MHz. Differential mode delay (DMD) analysis of this type of filament consistently revealed that the lower order modes were concurrent, but that the higher order modes were increasingly delayed, the highest order modes showing from 1 to 3 ns/km relative delay. More than half of the propagating modes showed relative delay.

The bandwidth values reported herein are as measured with a "mode scrambler" apparatus of the type described by W. F. Love in "Digest of Topical Meeting on Optical Fiber Communication" (Optical Society of America, Washington, D. C., 1979), paper ThG2, pp. 118-120. It is noted that these values may be considerably lower than those obtained without the use of a mode scrambler.

An attempt was made to improve bandwidth by eliminating the step-graded refractive index feature caused by the abrupt elimination of $B_2O_3$ at the core-barrier layer interface. The $B_2O_3$ concentration was graded from the barrier layer level to zero at a radius $r_d$ as shown by dashed line 16 while maintaining the concentrations of the other dopants at the values represented by curves 10, 12 and 14 of FIG. 1. In filaments wherein the radius $r_d$ was 27.2 μm and the core radius $r_a$ was 31.25 μm, the average bandwidth was 250 ; MHz at 900 nm. An examination of the differential mode delay of representative filaments showed that grading $B_2O_3$ into the core is not without merit. FIG. 2, which is a DMD curve for a fiber wherein $r_d$ is 27.2 μm shows that about 60% of the modes were relatively concurrent for that filament. This DMD curve indicates that a refractive index profile discontinuity is adversely affecting the higher order modes even when the abrupt step is eliminated by ramping the $B_2O_3$ from the barrier layer level to some finite radius within the core.

BRIEF DESCRIPTION OF THE INVENTION

The present invention pertains to a high bandwidth gradient index optical filament comprising an outer cladding layer, a barrier layer and a core. The barrier layer, which has an index of refraction equal to or less than that of the cladding layer, is disposed on the inside wall surface of the cladding layer. The barrier layer comprises $SiO_2$, $GeO_2$, $B_2O_3$ and $P_2O_5$, the quantity of each of these oxides being substantially uniform throughout the thickness of the barrier layer. The core, which is formed of a high purity glass having a gradient index of refraction, is disposed within the barrier layer and adhered thereto to form an interface therebetween. The core preferably has an index of refraction approximately equal to the barrier layer at the core-barrier layer interface. The core consists essentially of $SiO_2$, $B_2O_3$, $P_2O_5$ and $GeO_2$. The quantity of $B_2O_3$ decreases within the core from the barrier layer level to zero at a radius $r_d$ which is betwween 0.75 and 0.90 times the core radius $r_a$. The concentration gradient of $P_2O_5$ and $GeO_2$ substantially follow a power law curve for the core between radius $r_d$ and the filament axis. The concentration of $P_2O_5$ in the core at radii between $r_a$ and $r_d$ increases from the concentration thereof in the barrier layer to the concentration thereof at radius $r_d$ at a rate greater than the concentration of $P_2O_5$ would increase if the power law $P_2O_5$ gradient extended into the region between radii $r_a$ and $r_d$. The concentration of $GeO_2$ between radii $r_d$ and $r_a$ is equal to or less than the barrier layer level of $GeO_2$.

DETAILED DESCRIPTION OF THE INVENTION

It is to be noted that the drawings are illustrative and symbolic of the present invention and there is no intention to indicate scale or relative proportions of the elements shown therein.

Figure 3:
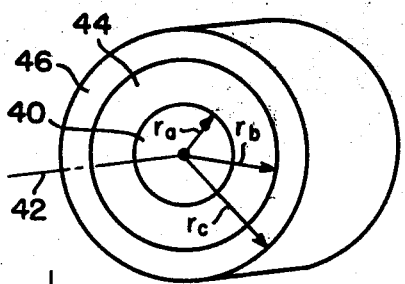
FIG. 3 is an oblique view of an optical waveguide in accordance with the present invention.

This invention pertains to optical waveguide filaments of the type illustrated in FIG. 3 wherein core 40 having radius $r_a$ is centered around axis 42. Surrounding core 40 are barrier layer 44 having radius $r_b$ and cladding 46 having radius $r_c$.

Figure 4:
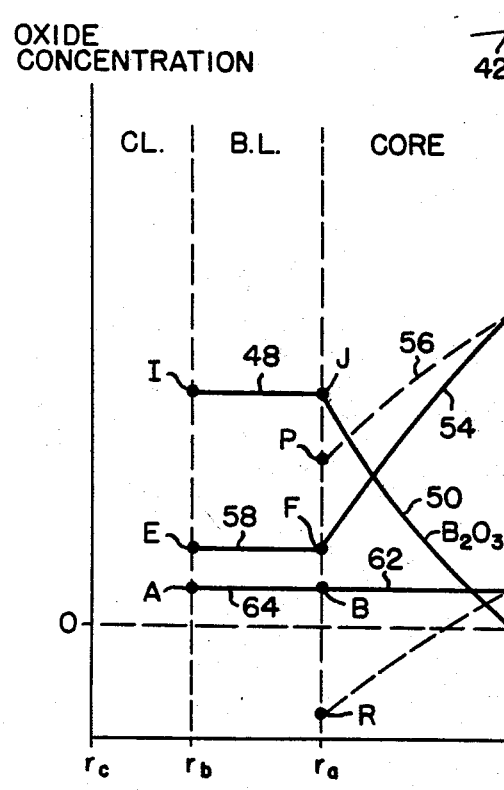
FIG. 4 is a graphical illustration of the dopant concentration levels of an optical waveguide filament formed in accordance with the present invention.

In accordance with the present invention, the optical waveguide filament comprises silica doped with the oxides illustrated in FIG. 4. The barrier layer contains $B_2O_3$, $P_2O_5$ and $GeO_2$ as illustrated by lines 48, 58 and 64, respectively. This filament differs from prior art filaments in that, in addition to the $B_2O_3$ decreasing to zero at radius $r_d$ as indicated by line 50, the concentrations of $P_2O_5$ and $GeO_2$ within the core are as follows. The concentration of $P_2O_5$ varies according to a power law for the core between radius $r_d$ and axis $r_o$ as indicated by curve 52, but it increases at a rate greater than the power law gradient 52 between radii $r_a$ and $r_d$ as indicated by curve 54. In order to emphasize the steepness of curve 54 as compared to power law curve 52, the power law curve 52 is extended between radii $r_a$ and $r_d$ as illustrated by dashed line 56. The concentration of $P_2O_5$ in the barrier layer is the same as that at the core-barrier layer interface as indicated by curve 58. The concentration of $GeO_2$ between axis $r_o$ and radius $r_d$ varies according to a power law for the core as indicated by curve 60. The concentration of $GeO_2$ between radii $r_a$ and $r_d$ is preferably equal to the concentration thereof in the barrier layer in order to avoid abrupt concentration changes. However, the $GeO_2$ concentration between radii $r_a$ and $r_d$ may be less than the barrier layer level, and the $GeO_2$ may be completely omitted from that region of the waveguide. Also, point C on curve 60 may be any level between zero and the barrier layer level of $GeO_2$. The bandwidth of such a filament is much greater than that of the prior art filaments described above in conjunction with FIGS. 1 and 2 when $r_d$ is optimized. Bandwidths of at least 700 MHz at some wavelength for a 1 km length of filament have been achieved in filaments wherein radius $r_d$ is between 0.75 and 0.90 $r_a$. Bandwidths greater than 1 GHz have been achieved by specific embodiments to be described hereinbelow wherein radius $r_d$ is 0.82 $r_a$.

To design a specific optical waveguide filament embodying the features of the present invention, the following well known factors should be considered. The axial composition is chosen to satisfy numerical aperture, attenuation and dispersion requirements. The barrier layer composition is chosen to meet sinterability and refractive index requirements. As taught in the aforementioned Olshansky et al. application, the refractive index of the barrier layer should be equal to or less than that of the tubular starting member which forms the filament cladding. The tubular starting member has a high silica content and may consist of pure SiO$_2$ or SiO$_2$ doped with B$_2$O$_3$ or the like.

Figure 1:
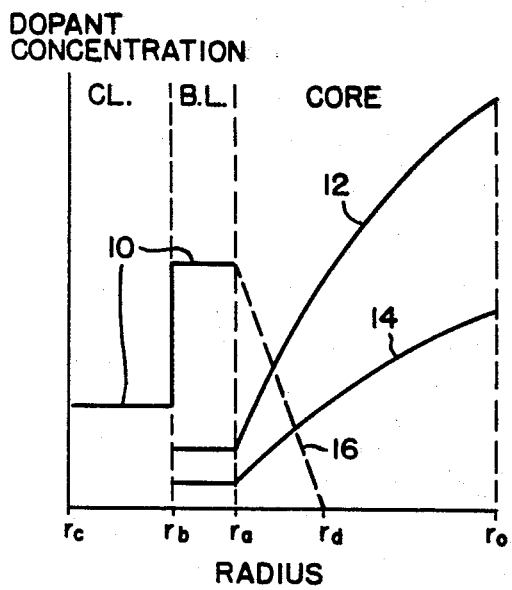
FIG. 1 is a graphical illustration of the dopant concentration in a prior art gradient index of refraction profile optical waveguide.
Figure 2:
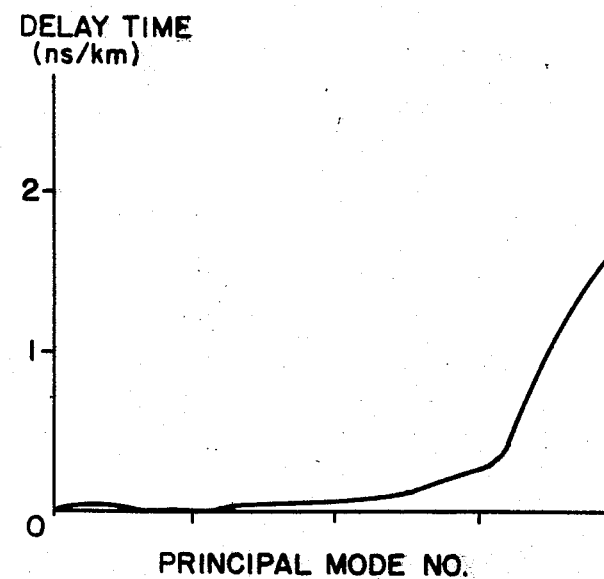
FIG. 2 is a graphical illustration of the principal mode number versus delay time of an optical waveguide formed in accordance with the graph of FIG. 1.

The shapes of curves 52 and 60 are conventionally determined by the alpha profile shape selected for the particular waveguide. As shown in FIG. 1, these curves would have conventionally terminated at the core-barrier layer interface at oxide concentration levels determined by the barrier layer composition. The optical waveguide filament of the present invention differs from the prior art in that, although the power law curves 52 and 60 are determined by the alpha profile shape selected for the waveguide, these curves are interrupted at the radius r$_d$. More specifically, the concentration C$_P$ of P$_2$O$_5$ in weight percent at radius r between the filament axis and radius r$_d$ is described by the equation $$C_p = P + (H-P)[1-(r/r_a)^\alpha] \qquad (2)$$

where H is the predetermined axial concentration of P$_2$O$_5$ and P is the value which the concentration of P$_2$O$_5$ would achieve if the curve 52 were extended to radius r$_a$. It is noted that the value P is greater than the concentration of P$_2$O$_5$ in the barrier layer. The value of C$_P$ at radius r$_d$ is G as shown in FIG. 4.

The concentration C$_G$ of GeO$_2$ in weight percent at radius r between the filament axis and radius r$_d$ is described by the equation $$C_G = R + (D-R)[1-(r/r_a)^\alpha] \qquad (3)$$

where D is the predetermined axial concentration of GeO$_2$ and R is the value which the concentration of GeO$_2$ would achieve if the curve 60 were extended to radius r$_a$. It is noted that the value R is less than the concentration of GeO$_2$ in the barrier layer. The value of the GeO$_2$ concentration curve 60 at radius r$_d$ is C as shown in FIG. 4. The value C can be any GeO$_2$ concentration equal to or less than the barrier layer concentration. To minimize discontinuities, both line 62 and point C are preferably equal to the barrier layer concentration.

For equations 2 and 3 the term $\alpha$ is the refractive index gradient determining term appearing in equation 1. Curve 54 represents an increase in the P$_2$O$_5$ concentration between radii r$_a$ and r$_d$ which follows a gradient steeper than the power law gradient of curve 52. A slight grading between the slope of curve 54 and that of curve 52 in the region of point G is preferred to avoid possible discontinuities in the refractive index profile; however, the diffusion of P$_2$O$_5$ tends to smooth out the concentration profile in this region. Curve 50 is graded from the barrier layer level of B$_2$O$_3$ to zero. Curves 50 and 54 may be linear, or they may curve slightly so that their second derivatives are negative or positive, ie., either of these curves may have a slight bow downward or upward as viewed in FIG. 4. As illustrated in FIG. 4, curves 50 and 54 preferably follow a core power law profile shape wherein the exponent is about 2. The balance of the filament composition consists essentially of SiO$_2$.

The optical waveguide filament of the present invention is formed by depositing the barrier layer on the inner surface of a bait tube and thereafter depositing the core material on the surface of the barrier layer. Generally, both the barrier layer and the core material are formed by depositing a plurality of layers of oxides. Any one of the many well known methods of forming glassy deposits on the inner surface of a bait tube may be employed. For examples of such deposition processes, see U.S. Pat. Nos. 3,823,995 and 3,711,262, and the publications: MacChesney et al., *Applied Physics Letters*, Vol. 23, No. 6, Sept. 15, 1973, p. 340; MacChesney et al., *Proceedings of the IEEE*, Vol. 62, No. 9, Sept. 1974, page 1278; and Jaeger et al., *Bulletin of the American Ceramic Society*, Vol. 55, No. 4, April 1976, page 455. In such processes, glass layers are deposited on the inner surface of the glass bait tube to yield a glass preform which is ultimately drawn into a filament.

Figure 5:
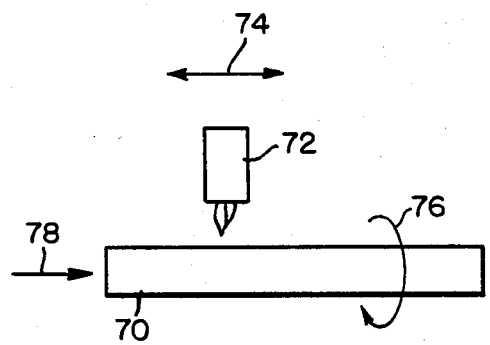
FIG. 5 is a schematic illustration of an apparatus employed in the formation of the optical filament of the present invention.

Referring to FIG. 5, there is a schematic illustration of an apparatus for forming the barrier layer and core material on the inner surface of bait tube 70. Heating means 72 is caused to move relative to tube 70 as indicated by arrow 74. Tube 70 rotates about its axis as indicated by arrow 76. Reactants flow into and through tube 70 as indicated by arrow 78. Each traverse of heating means 72 in the direction of arrow 78 causes a layer of uniform composition to be deposited. A predetermined number of passes of the heating means along the tube is required to form the barrier layer and the core portion of the preform. As used herein, the phrase "pass fraction" means the number of a particular pass of the heating means during the formation of the core portion divided by the total required number of passes required to form the core portion, i.e., that portion of the filament between radius r$_a$ and the filament axis r$_o$. If 50 passes of the heating means were required to form the core, the pass fraction of the tenth pass would be 0.2, and that of the fiftieth pass would be 1.0. The radius r is related to the pass fraction x by the equation $$r = r_a \sqrt{1-x} \qquad (4)$$

where r$_a$ is the core radius. Thus, the previously mentioned range of r$_d$ as being between 0.75 r$_a$ and 0.90 r$_a$ would correspond to a pass fraction between 0.2 and 0.43.

The bait tube may be formed of pure SiO$_2$ or SiO$_2$ doped with one or more oxides including B$_2$O$_3$. The reactants necessary to form the oxide layers in bait tube 70 include oxygen and compounds containing the elements necessary to form the desired oxides. The oxides SiO$_2$, B$_2$O$_3$, P$_2$O$_5$ and GeO$_2$ can be deposited by employing the reactants SiCl$_4$, BCl$_3$, POCl$_3$ and GeCl$_4$, respectively. This list of reactants is intended to be exemplary, it being well known that other reactants can be employed to form the listed oxides.

Numerous reactant delivery systems known in the prior art are suitable for delivering reactants 78 to tube 70. Reference is made in this regard to the teachings of U.S. Pat. Nos. 3,826,560, 4,148,621 and 4,173,305 and copending patent application Ser. No. 872,619, "Reactants Delivery System for Optical Waveguide Manufacturing" filed Jan. 26, 1978 by M. Aslami, now U.S. Pat. No. 4,212,663.

Figure 6:
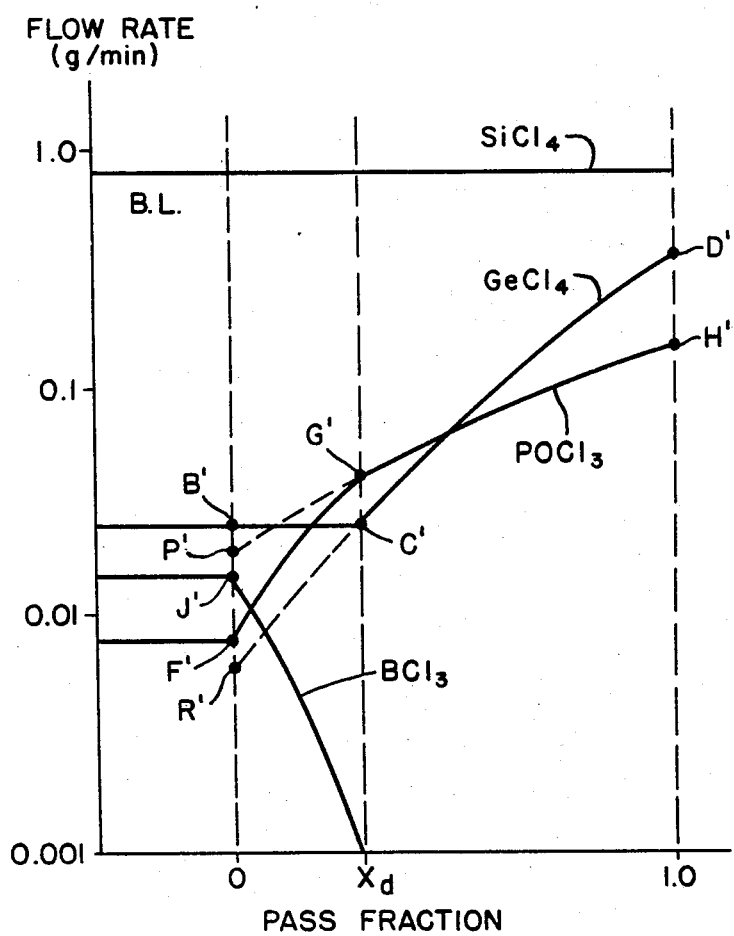
FIG. 6 is a graphical illustration of the source material flow rates employed in the formation of an optical waveguide filament in accordance with the present invention.

The relative flow rates of the reactants required for forming the filament represented by the composition diagram of FIG. 4 are shown in FIG. 6, wherein "Flow Rate" is plotted on a log scale. The same letters that are used in FIG. 4 to represent concentration values are primed in FIG. 6 to represent the corresponding flow rates necessary to provide those concentration values.

The flow rates of all reactants are held constant to form the barrier layer.

To form the outer region of the core material between the barrier layer and the core break-point located at pass fraction $x_d$ corresponding to radius $r_d$, the flow rates are controlled as follows. The flow rate of GeCl$_4$ is either terminated after formation of the barrier layer, or it is maintained at some constant value up to the flow rate employed to form the barrier layer. The flow rate of BCl$_3$ is decreased from level J' to zero flow at pass fraction $x_d$. The flow rate of POCl$_3$ is increased from level F' to level G'.

The inner portion of the core material is formed in the following manner. The flow rate $F_G$ of GeCl$_4$ is increased from point C' to point D' according to the equation $$F_G = R' + (D' - R')[1 - (1-x)^{\alpha/2}] \quad (5)$$

where $x_d \leq x \leq 1.0$. Flow rate R' is a value below the barrier layer value of GeCl$_4$. Flow rate C', which is the value of $F_G$ when $x = x_d$, is a value of GeCl$_4$ within the range of zero through the barrier layer level of GeCl$_4$. At the same time, the flow rate $F_P$ of POCl$_3$ is increased from level G' to level H' according to the equation $$F_P = P' + (H' - P')[1 - x)^{\alpha/2}] \quad (6)$$

where $x_d \leq x \leq 1.0$. Flow rate P' is a value above the barrier layer flow rate of POCl$_3$. Flow rate G' is the value of $F_P$ when $x = x_3$.

The flow rate of SiCl$_4$ may remain constant throughout the entire deposition process.

The following is a typical example of the formation of an optical waveguide filament in accordance with the present invention. A silica substrate tube containing about 4 wt. percent B$_2$O$_3$ and having an outside diameter of 25 millimeters and a wall thickness of about 1.3 millimeters is mounted in a deposition lathe well known in the art. The constituent reactants SiCl$_4$, BCl$_3$, GeCl$_4$, and POCl$_3$ are delivered to the substrate tube by a chemical vapor deposition system well known to one familiar with the art; specifically, reference is made in this regard to the teachings of the above mentioned Aslami application and U.S. Pat. Nos. 3,826,560, 4,148,621 and 4,173,305. Illustrative parameters of the process of this example have been mathematically calculated and estimated to be as set out in Table I following.

TABLE I

| | Reactants Flow Rates in g/min | | | |
|---|---|---|---|---|
| | SiCl$_4$ | GeCl$_4$ | POCl$_3$ | BCl$_3$ |
| Barrier Layer | 0.83 | 0.041 | 0.009 | 0.026 |
| First Core Pass | 0.83 | 0 | 0.009 | 0.026 |
| Pass Fraction 0.33 | 0.83 | 0.02 | 0.059 | 0 |
| Pass Fraction 1.0 | 0.83 | 0.243 | 0.110 | 0 |

For the example of Table I the oxygen provided for reaction was about 1000 sccm. The forming temperature was about 1880° C. during the deposition of the barrier layer, and it then decreased linearly to 1720° C. at pass fraction $x = 1$. The transverse rate of layer application was about 15 cm/min for both the barrier layer and core; the barrier layer being formed by 10 passes or layers while the core was formed by 70 passes. As used herein the term "core pass" means the number of the particular pass being made by the burner during the formation of the core. The flow rate of BCl$_3$ was decreased linearly from the barrier layer value at point J' of FIG. 6 to zero on the 23rd core pass (pass fraction equal 0.33). The flow rate of GeCl$_4$ remained at zero until the 23rd pass, after which it was increased to its maximum value in accordance with equation 5. The flow rate of POCl$_3$ was increased linearly from the barrier layer level at point F' to 0.059 g/min on the 23rd core pass. The flow rate of POCl$_3$ was thereafter increased to its maximum value in accordance with equation 6. In the determination of the flow rates of GeCl$_4$ and POCl$_3$ in accordance with equations 5 and 6, the term "$\alpha$" was set equal to 1.975 and term "x" was varied between 0.33 and 1.0 depending upon the burner pass number.

Figure 7:
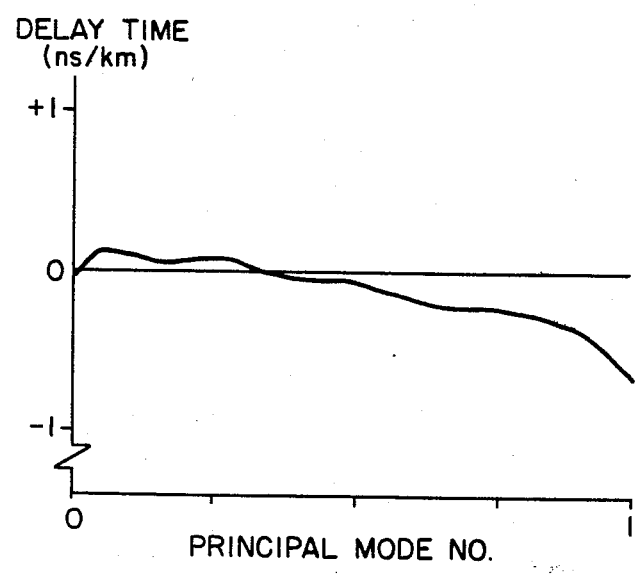
FIGS. 7 and 8 are graphical illustrations of the principal mode number versus delay time for two optical waveguides formed in accordance with the present invention.

The resultant preform was then collapsed under pressure in accordance with the teachings of U.S. Pat. No. 4,154,591. During collapse, the preform temperature was increased from 2000° C. to 2500° C. during five burner passes, while the preform was rotated at a speed of .60 rpm. The resultant solid preform was then mounted in a drawing apparatus as well known in the art, the end thereof heated to a temperature of about 1900° C. and drawn into an optical waveguide filament having the cross-sectional profile as illustrated in FIG. 4, except that segment 62 was zero, and a DMD curve as illustrated by FIG. 7, measured at 799 nm. The resulting optical waveguide had an outside diameter of about 125 micrometers a core diameter of about 60 micrometers, and a barrier layer thickness of about 5 micrometers. The silica cladding containing 4 wt. % B$_2$O$_3$. The barrier layer contained 6 wt. % B$_2$O$_3$, 1 wt. % GeO$_2$ and 2 wt. % P$_2$O$_5$ with the balance being silica. At radius $r_d$, which was 24.2 micrometers, the concentration of GeO$_2$ was 0.5 wt. % and that of P$_2$O$_5$ was about 8 wt. %. The axial composition of the core was about 8 wt. % GeO$_2$, about 16 wt. % P$_2$O$_5$ and about 76 wt. % SiO$_2$.

Figure 8:
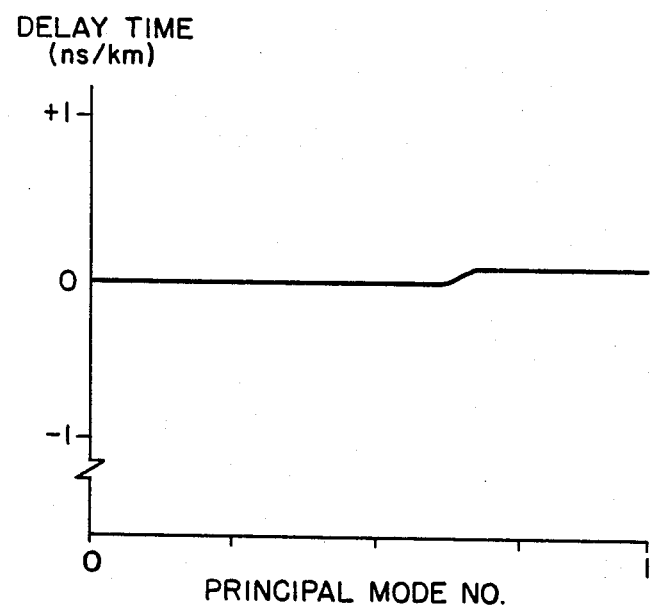

Another optical waveguide referred to as filament No. 2 was made in accordance with the previous example except that the value of $\alpha$ was set at 1.98 instead of 1.975, all other parameters remaining unchanged. The DMD curve for the second filament, measured at 799 nm, is illustrated in FIG. 8. The cross-sectional concentration profile of this filament was similar to that described above for filament No. 1.

Filament No. 3 was made in accordance with the foregoing description for making filament No. 2 except that the flow of GeCl$_4$ was maintained at the barrier layer level of 0.041 g/min during the formation of the outer region of the core, and point c' of segment C'D' of FIG. 6 wa also 0.041 g/min. Thus, the resultant optical waveguide filament had a cross-sectioned profile as illustrated in FIG. 4.

Table II sets forth some of the physical and optical characteristics of the filaments of Examples 1, 2 and 3.

TABLE II

| | Filament No. | | |
|---|---|---|---|
| | 1 | 2 | 3 |
| $\alpha$ - value | 1.975 | 1.98 | 1.98 |
| core diameter | 59 μm | 60.5 μm | 64.0 μm |
| radius $r_d$ | 24.2 μm | 24.8 μm | 26.2 μm |
| NA (100 s) | 0.208 | 0.209 | 0.207 |
| Attenuation (dB/km) | | | |
| 820 nm | 2.9 | 3.7 | 2.5 |
| 900 nm | 2.0 | 2.8 | 1.9 |
| 1060 nm | 1.6 | 2.3 | 1.0 |
| Bandwidth (MHz) | | | |
| 900 nm | 630 | 1390 | 1024 |
| 1300 nm | 1060 | 700 | 1082 |

TABLE II-continued

|  | Filament No. | | |
| --- | --- | --- | --- |
|  | 1 | 2 | 3 |
| Length (km) | 1.12 | 1.12 | 1.16 |

Note that the DMD curves for filaments 1 and 2 (FIGS. 7 and 8) are virtually straight. The tilt to the DMD curve of FIG. 7 indicates that filament No. 1 exhibits high bandwidths at wavelengths greater than the DMD measurement wavelength of 799 nm. Indeed, Table II shows that filament No. 1 exhibits a higher bandwidth at 1300 nm than at 900 nm. It is noted that a perfectly horizontal DMD trace would manifest a filament whose bandwidth is optimized at 799 nm, the wavelength of measurement. The DMD trace of filament No. 2 (FIG. 8) is more nearly horizontal, thus indicating that the bandwidth thereof is optimized near 799 nm. Table II shows that the bandwidth of filament No. 2 is 1390 MHz at 900 nm. It can thus be seen that the bandwidth can be optimized at a desired wavelength by controlling the index gradient factor $\alpha$. The greater than one GHz bandwidths which were obtained for filaments made in accordance with the present invention are almost twice as great as the bandwidths exhibited by filaments having oxide concentrations of the type represented by FIG. 1.

I claim:

1. A gradient index optical waveguide filament having a bandwidth of at least 700 MHz, said filament comprising
an outer cladding layer,
a barrier layer disposed on the inside wall surface of said cladding layer, said barrier layer comprising $SiO_2$, $GeO_2$, $B_2O_3$ and $P_2O_5$, the concentration of each of said $SiO_2$, $GeO_2$, $B_2O_3$, and $P_2O_5$ being substantially uniform throughout the thickness of said barrier layer, and
a core of high purity glass having a gradient index of refraction disposed within said barrier layer and adhered thereto to form an interface therebetween, said core consisting essentially of $SiO_2$, $B_2O_3$, $P_2O_5$ and $GeO_2$, the quantity of $B_2O_3$ decreasing within said core from the barrier layer level to zero at a radius $r_d$ which is located between 0.75 and 0.9 times the core radius $r_a$, the concentration gradient of $P_2O_5$ and $GeO_2$ substantially following a power law curve between said radius $r_d$ and the filament axis, the concentration of $P_2O_5$ in said core at radii between $r_a$ and $r_d$ increasing from the concentration thereof in said barrier layer to the concentration thereof at said radius $r_d$ at a rate greater than the concentration of $P_2O_5$ would increase if said power law $P_2O_5$ gradient extended into said region between radii $r_a$ and $r_d$, and the concentration of said $GeO_2$ between radii $r_d$ and $r_a$ being constant and equal to or less than the barrier layer level of $GeO_2$.

2. A filament in accordance with claim 1 where said cladding layer comprises a high silica-content glass.

3. A filament in accordance with claim 2 wherein said cladding layer comprises $SiO_2$ doped with $B_2O_3$.

4. A filament in accordance with claim 3 wherein the concentration of $GeO_2$ between radii $r_a$ and $r_d$ is the same as the concentration of $GeO_2$ in said barrier layer.

5. A filament in accordance with claim 3 wherein the concentration of $GeO_2$ between radii $r_a$ and $r_d$ is less than the concentration of $GeO_2$ in said barrier layer.

6. A filament in accordance with claim 2 wherein the concentration of $P_2O_5$ in the region between the fiber axis and radius $r_d$ is given by the equation $$C_P = P + (H-P)[1 = (r/r_a)^\alpha]$$

where $0 \leq r \leq r_d$, $\alpha$ is a parameter between 1 and $\infty$, H is the axial concentration of $P_2O_5$ and P is an imaginary concentration level at radius $r_a$, said level P being greater than the barrier layer level of $P_2O_5$.

7. A filament in accordance with claim 6 wherein the concentration of $GeO_2$ between the filament axis and radius $r_d$ is given by $$C_G = R + (D-R)[1-(r/r_a)^\alpha]$$

where $0 \leq r \leq r_d$, D is the axial concentration of $GeO_2$, R is an imaginary value of GeO at radius $r_a$, R being less than the barrier layer level of $GeO_2$, and the concentration C of $GeO_2$ at radius $r_d$ being equal to or less than the concentration of $GeO_2$ in the barrier layer.

8. A filament in accordance with claim 1 wherein the index of refraction of said barrier layer is equal to or less than that of said cladding layer.

9. An optical waveguide filament comprising
an outer cladding layer,
a barrier layer disposed on the inside wall surface of said cladding layer, and
a core of high purity glass having a gradient index of refraction disposed within said barrier layer and adhered thereto to form an interface therebetween, said core comprising $SiO_2$ doped with a sufficient amount of a first oxide to increase the refractive index of the core to a value greater than that of said outer cladding layer, the concentration gradient of said first oxide following a power law gradient between the filament axis and a radius $r_d$ that is less than the radius $r_a$ of said core such that the refractive index is greatest at the filament axis, the concentration of said first oxide in said core at radii between $r_a$ and $r_d$ increasing from the concentration thereof in said barrier layer to the concentration thereof at said radius $r_d$ at a rate greater than the concentration of said first oxide would increase if said power law gradient of said first oxide extended into said region between radii $r_a$ and $r_d$.

10. A filament in accordance with claim 9 wherein said first oxide is $P_2O_5$.

11. A filament in accordance with claim 10 wherein said core also contains $GeO_2$, the concentration of said $GeO_2$ substantially following a power law curve between radius $r_d$ and the filament axis.

12. A filament in accordance with claim 11 wherein said barrier layer comprises $SiO_2$, $GeO_2$, $B_2O_3$ and $P_2O_5$, the concentration of each of said $SiO_2$, $GeO_2$, $B_2O_3$, and $P_2O_5$ being substantially uniform throughout the thickness of said barrier layer.

13. A filament in accordance with claim 12 wherein the concentration of said $GeO_2$ between radii $r_d$ and $r_a$ is constant and equal to or less than the barrier layer level of $GeO_2$.

14. A filament in accordance with claim 13 wherein said core further comprises $B_2O_3$, the quantity of $B_2O_3$ decreasing within said core from the barrier layer level to zero at said radius $r_d$.

15. A filament in accordance with claim 14 wherein said radius $r_d$ is located between 0.75 and 0.9 times said core radius $r_a$.

16. A filament in accordance with claim 14 wherein the index of refraction of said barrier layer is equal to or less than that of said cladding layer.

17. An optical waveguide filament comprising
an outer cladding layer,
a barrier layer disposed on the inside wall surface of said cladding layer, and
a core of high purity glass having a gradient index of refraction disposed within said barrier layer and adhered thereto to form an interface therebetween, said core comprising a high purity glass doped with a sufficient amount of a first oxide to increase the refractive index of the core to a value greater than that of said outer cladding layer, the concentration gradient of said first oxide following a power law gradient between the filament axis and a radius $r_d$ that is between 0.75 and 0.9 times the core radius $r_a$, such that the refractive index is greatest at the filament axis, the concentration of said first oxide in said core at radii between $r_a$ and $r_d$ varying from the concentration thereof in said barrier layer to the concentration thereof at said radius $r_d$ at a rate greater than the concentration of said first oxide would vary if said power law gradient of said first oxide extended into said region between radii $r_a$ and $r_d$.

18. A filament in accordance with claim 17 wherein the concentration of said first oxide is greatest at the filament axis.

19. A method of forming a preform for a high bandwidth optical waveguide filament comprising the steps of
providing a glass bait tube, forming a barrier layer on the inside wall surface of said tube,
depositing n layers of core glass on the surface of said barrier layer, said core glass comprising a high purity base glass and at least one dopant, the concentration of said dopant changing between said barrier layer and the inner surface of said core glass in such a manner that the refractive index of said core glass continually increases between said barrier layer and the inner surface of said core glass, the change in concentration of said dopant with each layer in the final $(1-x)n$ layers being such that the dopant concentration in the corresponding inner core region of the resultant filament follows a power law curve with respect to core radius, and the change in concentration of said dopant in the first $xn$ layers being such that the dopant concentration in the corresponding outer core region of the resultant filament has a greater change with respect to radius than it would have if said power law governed the dopant concentration in said outer core region, wherein x is a number between 0.2 and 0.43.

20. A method in accordance with claim 19 wherein said barrier layer comprises said base glass, $B_2O_3$ and said at least one dopant, the first $xn$ layers of said core glass also comprising $B_2O_3$, the concentration of $B_2O_3$ in said core glass gradually decreasing from the barrier layer level to zero during the first $xn$ layers.

21. The method of claim 20 wherein said at least one dopant comprises $P_2O_5$ and wherein the concentration of said dopant increases from a minimum value at said barrier layer to a minimum value at the inner surface of said core glass.

22. A method in accordance with claim 21 wherein said barrier layer further comprises $P_2O_5$.

23. A method in accordance with claim 22 wherein said barrier layer and the first $xn$ layers of said core glass further comprise $GeO_2$, the concentration of which is uniform throughout, the concentration of said $GeO_2$ increasing during the deposition of the last $(1-x)n$ layers to a maximum value at the inner surface of said core glass.

* * * * *